United States Patent
Tago

(10) Patent No.: US 9,733,472 B2
(45) Date of Patent: Aug. 15, 2017

(54) MONITORING CAMERA DEVICE

(71) Applicant: ASC Corporation, Tokyo (JP)

(72) Inventor: Kazuaki Tago, Tokyo (JP)

(73) Assignee: ASC CORPORATION, Tokyo (JP)

( * ) Notice: Subject to any disclaimer, the term of this patent is extended or adjusted under 35 U.S.C. 154(b) by 0 days.

(21) Appl. No.: 15/027,091

(22) PCT Filed: Nov. 18, 2014

(86) PCT No.: PCT/JP2014/080471
§ 371 (c)(1),
(2) Date: Apr. 4, 2016

(87) PCT Pub. No.: WO2015/098362
PCT Pub. Date: Jul. 2, 2015

(65) Prior Publication Data
US 2016/0238838 A1 Aug. 18, 2016

(30) Foreign Application Priority Data
Dec. 27, 2013 (JP) .................................. 2013-272329

(51) Int. Cl.
H04N 5/225 (2006.01)
G02B 27/00 (2006.01)
B08B 1/00 (2006.01)

(52) U.S. Cl.
CPC .......... *G02B 27/0006* (2013.01); *B08B 1/006* (2013.01); *B08B 1/008* (2013.01); *H04N 5/2252* (2013.01)

(58) Field of Classification Search
None
See application file for complete search history.

(56) References Cited

U.S. PATENT DOCUMENTS

2008/0072393 A1* 3/2008 Tanaka ...................... A47L 1/02
15/250.03
2013/0094848 A1* 4/2013 Wada .................. H04N 5/2252
396/448
2013/0272690 A1 10/2013 Aoki et al.

FOREIGN PATENT DOCUMENTS

JP S61-286824 A 12/1986
JP H10-216049 A 8/1998
(Continued)

OTHER PUBLICATIONS

Feb. 24, 2015 Search Report issued in International Patent Application No. PCT/JP2014/080471.

*Primary Examiner* — Stephen Coleman
(74) *Attorney, Agent, or Firm* — Oliff PLC

(57) ABSTRACT

A monitoring camera device is disclosed. The device includes a housing body in which at least a monitoring camera is built in, a transparent plastic-made semispherical dome-shaped cover portion provided on one surface of the housing body, a wiper mechanism rotatably provided on the housing body and which cleans the dome-shaped cover portion, and a wiper driving portion that reciprocatively rotates and drives the wiper mechanism. The wiper mechanism includes a silicon rubber-made wiper blade having an arc surface along a curved surface of the dome-shaped cover portion, and a wiper arm having both end portions rotatably provided around a central axis of the housing body, the central axis being parallel to a bottom surface of the dome-shaped cover portion, and to which the wiper blade is attached protruding to the dome-shaped cover portion side by a predetermined length.

5 Claims, 6 Drawing Sheets

(56) References Cited

FOREIGN PATENT DOCUMENTS

| JP | 2006-198602 A | 8/2006 |
|----|---------------|--------|
| JP | 2009-042672 A | 2/2009 |
| JP | 2012-083464 A | 4/2012 |

* cited by examiner

MONITORING CAMERA DEVICE

BACKGROUND OF THE INVENTION

Field of the Invention

The present invention relates to a monitoring camera device provided with a plastic-made dome-shaped cover portion in one surface of a housing body in which a monitoring camera and the like are built in. The present application claims the benefits of Japanese Patent Application No. 2013-272329, filed on Dec. 27, 2013, in Japan.

Description of Related Art

Monitoring camera devices having a monitoring camera and the like built in a dome-camera housing having a plastic-made semispherical clear dome window, are provided outdoors, especially, on a road. Therefore, dust, or rain drops at the time of raining are attached to a surface of the clear dome window that transmits a picture of the monitoring camera. The plastic-made semispherical clear dome window is more easily damaged than conventional glass-made semispherical clear dome window.

Therefore, in the monitoring camera device of Patent Document 1, a discharge hole is formed inside an arc wiper arm rotatably supported by the housing, and while the wiper arm is reciprocatively moved by a wiper driving portion, a high-pressure fluid is ejected toward the plastic-made clear dome window, so that the dust or water drops attached to the clear dome window are removed, and the clear dome window is cleared and a picture can be clearly imaged, without damaging the clear dome window. However, the monitoring camera device of Patent Document 1 requires a compressor and the like in order to jet the high-pressure fluid. Therefore, the structure becomes large in scale.

Patent Document 1: Japanese Patent Application Laid-Open No. 2006-198602

BRIEF SUMMARY OF THE INVENTION

The present invention has been made in view of the above problem, and an objective is to provide a cleanable monitoring camera device from which dust or water drops attached to a dome-shaped cover portion are removed without damaging the plastic-made dome-shaped cover portion with a simple structure.

A monitoring camera device according to the present invention includes: a housing body in which at least a monitoring camera is built in; a transparent plastic-made semispherical dome-shaped cover portion provided on one surface of the housing body; a wiper mechanism rotatably provided on the housing body, and configured to clean the dome-shaped cover portion; and a wiper driving portion configured to reciprocatively rotate and drive the wiper mechanism, wherein the wiper mechanism includes a silicon rubber-made wiper blade having an arc surface along a curved surface of the dome-shaped cover portion, and a wiper arm having both end portions rotatably provided around a central axis of the housing body, the central axis being parallel to a bottom surface of the dome-shaped cover portion, and to which the wiper blade is attached protruding to a side of the dome-shaped cover portion by a predetermined length.

The present invention can remove the dust or water drops attached to the dome-shaped cover portion and clean the dome-shaped cover portion without damaging the dome-shaped cover portion with a simple structure, by having a wiper blade member that cleans the plastic-made dome-shaped cover portion be made of silicon rubber having an arc surface along a curved surface of the dome-shaped cover portion.

DETAILED DESCRIPTION OF THE INVENTION

Hereinafter, a monitoring camera device to which the present invention is applied will be described in detail with reference to the drawings. Note that the present invention is not limited to the following examples, and can be arbitrarily changed without departing from the gist of the present invention.

Figure 1:
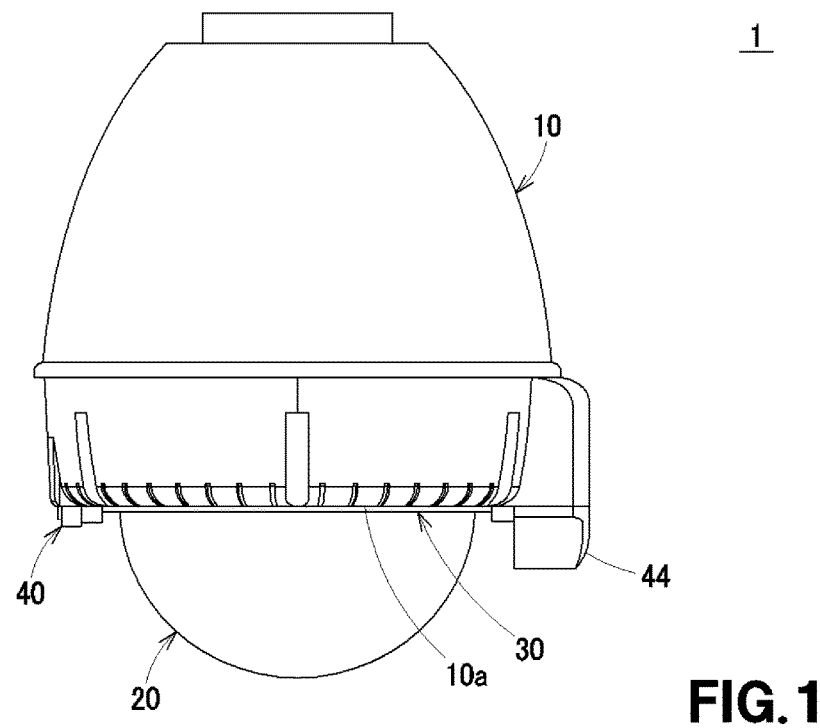
FIG. 1 is a front view illustrating a monitoring camera device.
Figure 2:
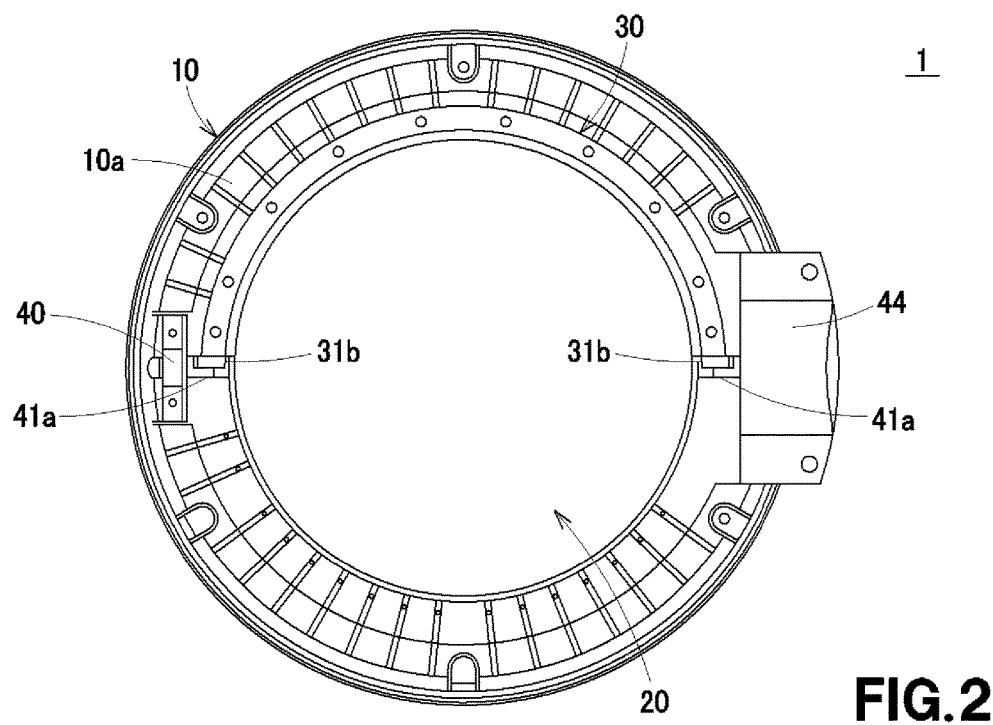
FIG. 2 is a bottom view illustrating the monitoring camera device.

As illustrated in FIGS. 1 and 2, a monitoring camera device 1 to which the present invention is applied is installed on a building or the like and is used mainly outdoors, and includes a housing body 10 in which a monitoring camera and the like are built in, a transparent plastic-made semispherical dome-shaped cover portion 20 provided on one surface 10a of the housing body 10, a wiper mechanism 30 having both end portions rotatably provided to the one surface 10a of the housing body 10 around a central axis that passes through a diameter parallel to a bottom surface (installation surface) of the dome-shaped cover portion 20, and which removes dust or water drops at the time of raining attached to a surface of the dome-shaped cover portion 20, and a wiper driving portion 40 that reciprocatively rotates and drives the wiper mechanism 30.

Figure 7:
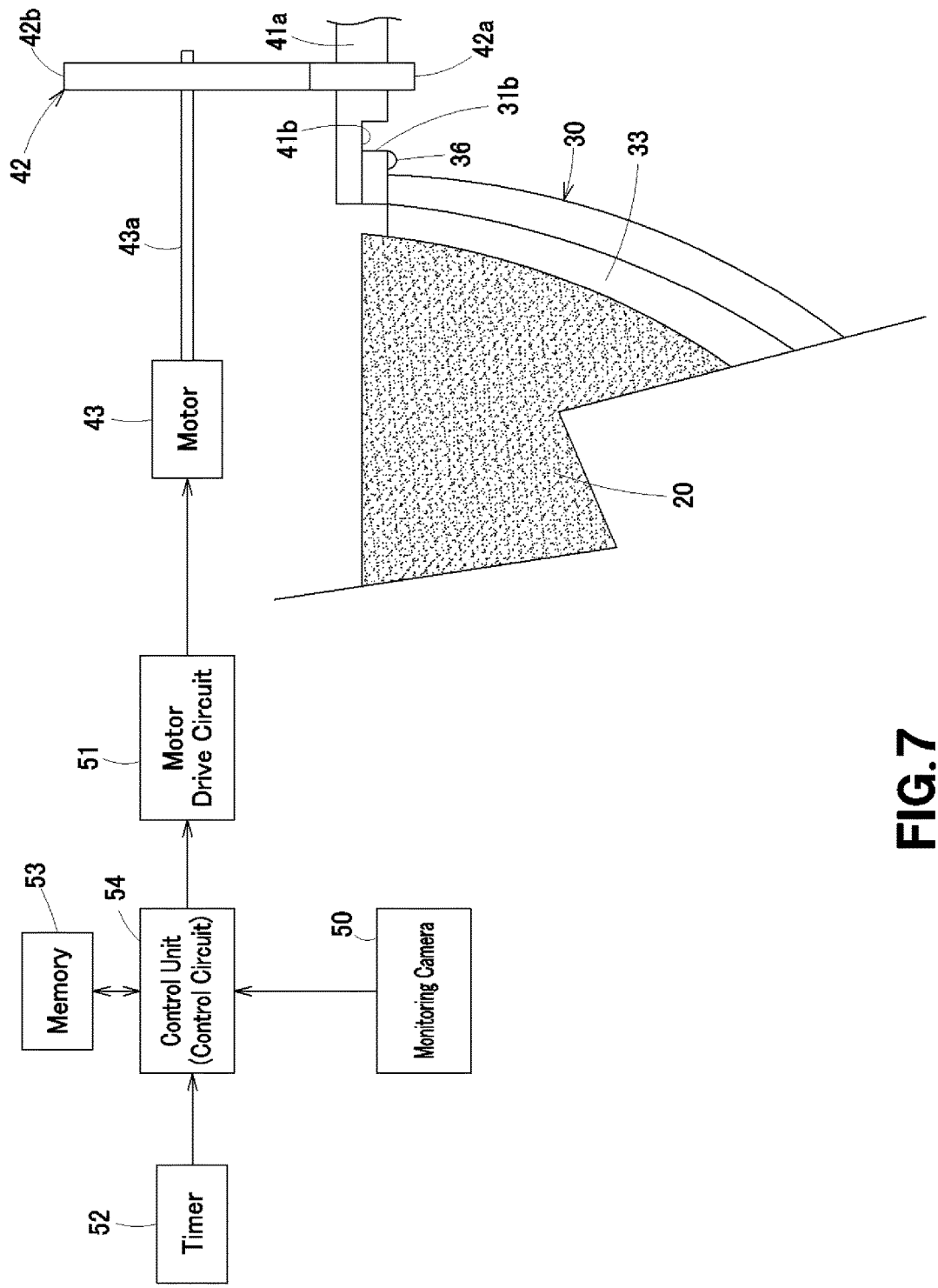
FIG. 7 is a block diagram illustrating a wiper driving portion.

The housing body 10 is formed into a cylindrical shape having an opening portion in the one surface 10a, and in which a monitoring camera 50, a motor drive circuit 51, a timer 52, a memory 53, and a control circuit 54 and the like mainly including a computer are built in, as illustrated in FIG. 7. Further, as illustrated in FIGS. 1 and 2, the dome-shaped cover portion 20 is provided on the one surface 10a of the housing body 10 to block the opening portion.

The dome-shaped cover portion 20 is formed into a semispherical shape (dome shape), with a synthetic resin such as polycarbonate, and is provided on the one surface 10a of the housing body 10 to block the opening portion of the one surface 10a of the housing body 10.

Figure 3:
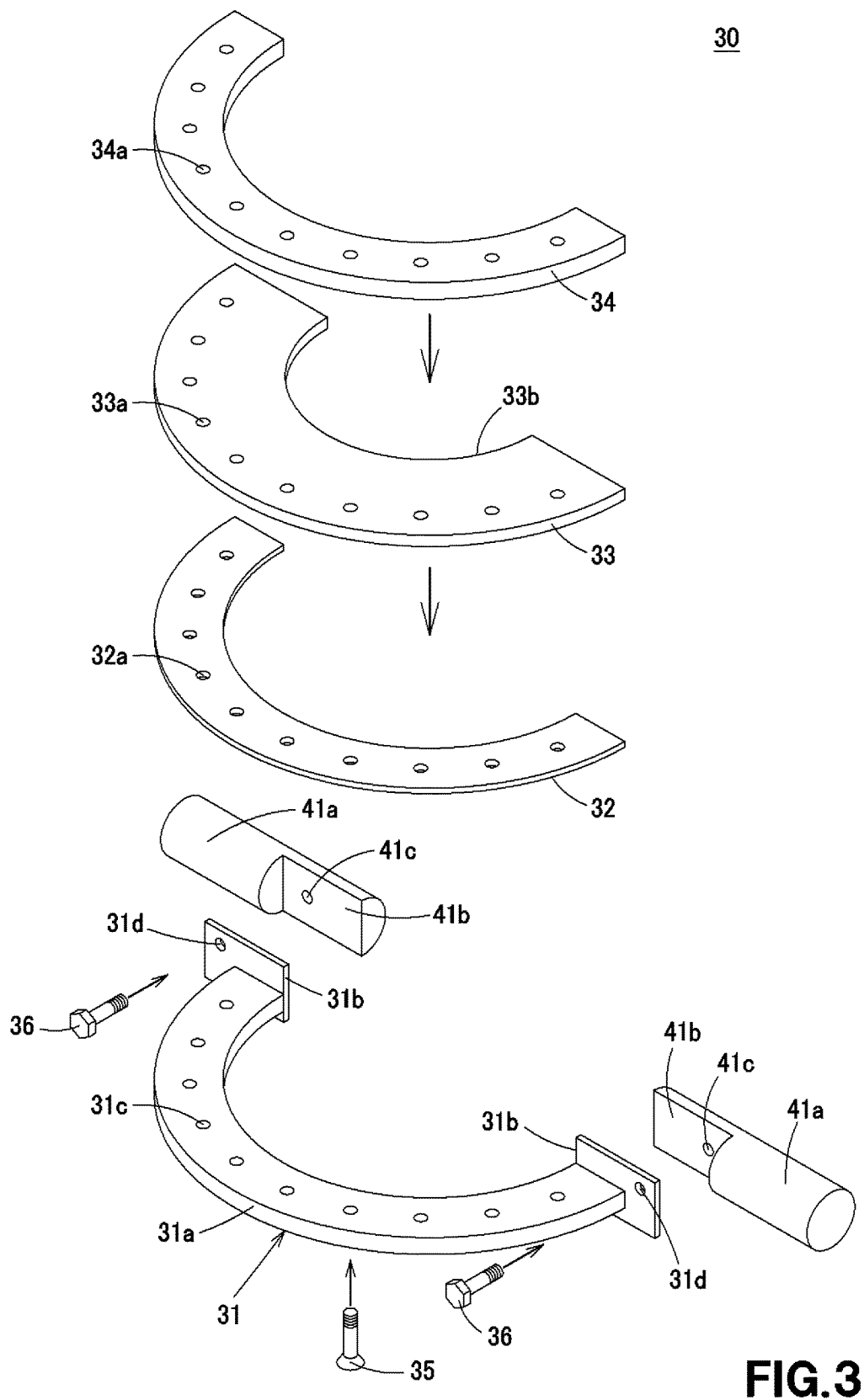
FIG. 3 is an exploded perspective view illustrating a wiper mechanism.

As illustrated in FIG. 3, the wiper mechanism 30 is configured from a first wiper arm 31 rotatably supported by the one surface 10a of the housing body 10, a retaining sheet 32 provided on one principal surface of the first wiper arm 31, a wiper blade 33 provided on one principal surface of the retaining sheet 32, and which removes the dust or water drops attached to the surface of the dome-shaped cover portion 20 when the wiper mechanism 30 is rotated, and a second wiper arm 34 provided on one principal surface of the wiper blade 33. The first wiper arm 31 and the second wiper arm 34 are fastened with fastening members 35 such as countersunk screws.

As illustrated in FIG. 3, the first wiper arm 31 includes a body portion 31a configured from an arc plate member, and attaching portions 31b integrally provided with both end portions of the body portion 31a.

The body portion 31a is formed into an arc shape, and is formed such that an inner peripheral surface facing the dome-shaped cover portion 20 is separated from a surface of the dome-shaped cover portion 20 by a predetermined distance. Further, the retaining sheet 32 is layered on the one principal surface of the body portion 31a. Further, a plurality of counterbored holes 31c into which the fastening members 35 such as countersunk screws are inserted is formed in the other principal surface of the body portion 31a with predetermined intervals. Here, the body portion 31a is formed such that the thickness becomes 1.7 mm, the width becomes 10 mm, and the inner peripheral surface is separated from the surface of the dome-shaped cover portion 20 by 5 mm.

The attaching portions 31b are configured from rectangular plate members, and are arranged perpendicular to the body portion 31a and integrally provided with both end portions of the body portion 31a by means of welding or the like. Further, through holes 31d are formed in the attaching portions 31b.

Therefore, the attaching portions 31b are fastened to the arm shafts 41a with fastening members 36 or the like, so that the wiper mechanism 30 can be detachably attached to arm shafts 41a. Therefore, for example, when replacement work of the wiper blade 33 is performed, only work to detach and attach the wiper mechanism 30 from/to the arm shafts 41a is performed in a high place where the monitoring camera device 1 is typically installed, and the replacement work of the wiper blade 33 can be performed in a stable place such as on the ground. The replacement work of the wiper blade 33 can be safely and efficiently performed.

Figure 4:
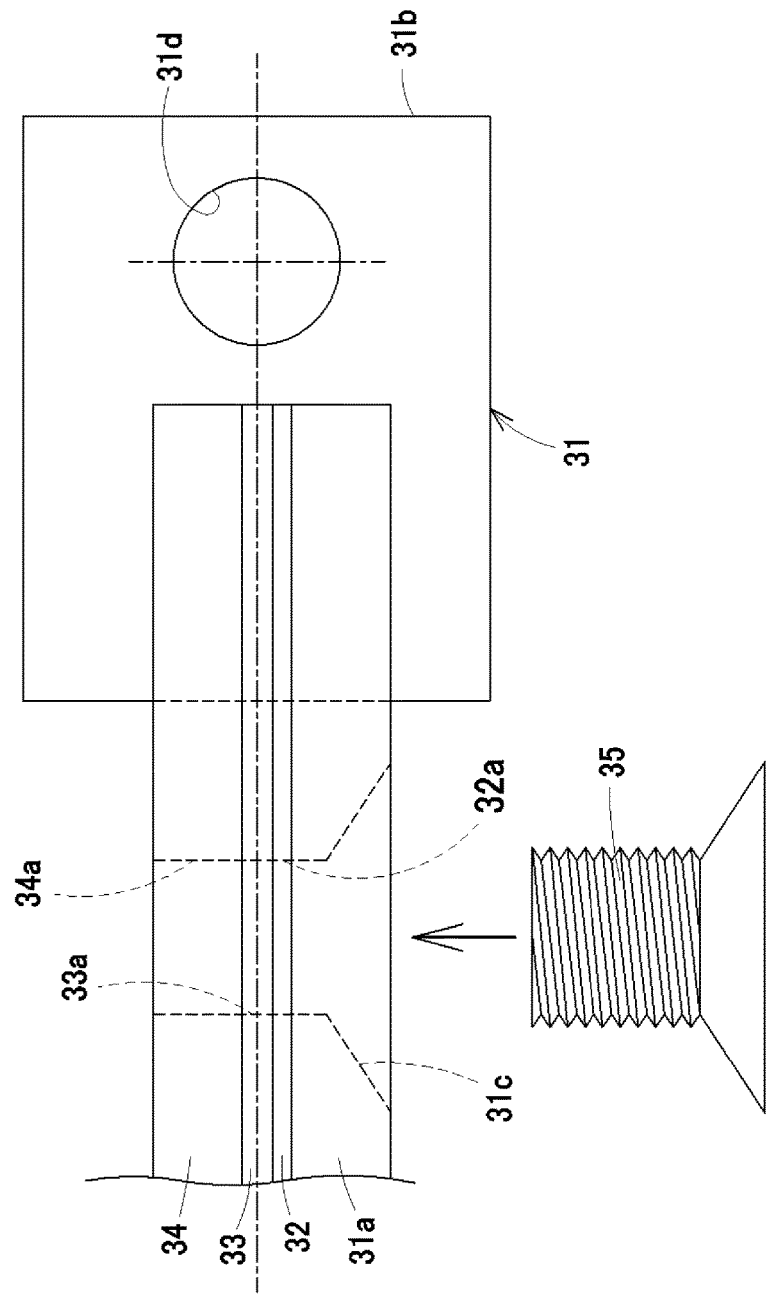
FIG. 4 is a front view illustrating a part of the wiper mechanism.

Further, as illustrated in FIG. 4, the body portion 31a is provided offset from an axis of the through hole 31d by the thickness of the retaining sheet 32 and half of the thickness of the wiper blade 33 so that a thickness center of the wiper blade 33 accords with the axis of the through hole 31d when the retaining sheet 32 and the wiper blade 33 are placed on the body portion 31a. For example, the body portion 31a is provided offset by 0.55 mm (0.3+0.25 mm) from the axis of the through hole 31d, in a case of using the retaining sheet 32 with the thickness of 0.3 mm and the wiper blade 33 with the thickness of 0.5 mm.

Therefore, even when the first wiper arm 31 (body portion 31a) is brought to face the one surface 10a side of the housing body 10 and the wiper mechanism 30 is attached to the arm shafts 41a, or even when the second wiper arm 34 is brought to face the one surface 10a of the housing body 10 and the wiper mechanism 30 is attached to the arm shafts 41a, the thickness center of the wiper blade 33 can be caused to accord with the axis of the arm shafts 41a. Therefore, in the work to attach the wiper mechanism 30 to the arm shafts 41a, the wiper mechanism 30 can be attached without caring about the direction, and workability is good.

As illustrated in FIG. 3, the retaining sheet 32 is a synthetic resin sheet formed in an arc shape approximately similar to the body portion 31a of the first wiper arm 31. Here, the retaining sheet 32 is formed such that the thickness becomes 0.3 mm.

Further, fitting holes 32a into which the fastening members 35 are fit are formed in the retaining sheet 32 in the positions corresponding to the counterbored holes 31c of the first wiper arm 31. This fitting hole 32a is formed to have the same size as the diameter of an internal thread of the fastening member 35 or a size from the diameter of the internal thread to an outer diameter, exclusive of the outer diameter, so that a thread of an axis portion of the fastening member 35 is fit into a periphery of the fitting hole 32a. Accordingly, when the fastening member 35 fastens the first wiper arm 31 and the second wiper arm 34, the thread is fit into the periphery of the fitting hole 32a of the retaining sheet 32.

Therefore, the retaining sheet 32 can prevent the fastening member 35 from being dropped off the first wiper arm 31, when the second wiper arm 34 is detached from the first wiper arm 31 to replace the wiper blade 33 or the like. Therefore, the replacement work of the wiper blade 33 can be efficiently performed. Further, the retaining sheet 32 is formed into a sheet shape. Therefore, the wiper blade 33 can be prevented from being sandwiched between the first wiper arm 31 and the second wiper arm 34 in an uneven state.

As illustrated in FIG. 3, the wiper blade 33 is a silicon-rubber made sheet formed in an arc manner approximately similarly to the body portion 31a of the first wiper arm 31, for example. More favorably, the wiper blade 33 is formed of transparent silicon rubber. The wiper blade 33 is formed of the transparent silicon rubber, and thus has excellent weather resistance and flame resistance, and can secure stability for high temperature and extremely low temperature in an outdoor environment. Further, the wiper blade 33 is formed of the transparent silicon rubber, and thus can minimize an influence on a picture even if friction residue of the wiper blade 33 is attached to the surface of the dome-shaped cover portion 20.

Further, inserting holes 33a into which the fastening members 35 are inserted are formed in the wiper blade 33 in the positions corresponding to the counterbored holes 31c of the first wiper arm 31.

Further, the wiper blade 33 is formed such that an inner peripheral surface 33b facing the dome-shaped cover portion 20 becomes an arc surface along a curved surface of the dome-shaped cover portion 20. Further, the wiper blade 33 is provided between the first wiper arm 31 and the second wiper arm 34 such that the inner peripheral surface 33b protrudes from inner peripheral surfaces of the first wiper arm 31 and the second wiper arm 34 to the dome-shaped cover portion 20 side by a predetermined length.

To be specific, the wiper blade 33 is provided such that the thickness becomes 0.5 mm, and the width becomes 18 mm. Therefore, since the width of the first wiper arm 31 is 10 mm, the wiper blade 33 is provided between the first wiper arm 31 and the second wiper arm 34 such that the inner peripheral surface 33b protrudes from the inner peripheral surfaces of the first wiper arm 31 and the second wiper arm 34 by 8 mm. Further, since the inner peripheral surfaces of the first wiper arm 31 and the second wiper arm 34 are formed separated from the surface of the dome-shaped cover portion 20 by 5 mm, the wiper blade 33 is provided to overlap with the surface of the dome-shaped cover portion 20 by 3 mm.

Figure 5:
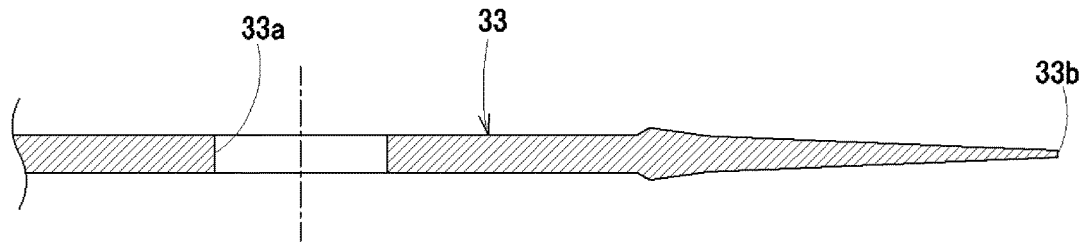
FIG. 5 is a sectional view illustrating a modification of a wiper blade.

Note that, as illustrated in FIG. 5, the wiper blade 33 may have the inner peripheral surface 33b in a tapered manner. Accordingly, friction of the wiper blade 33 to the surface of the dome-shaped cover portion 20 is reduced when the wiper blade 33 is driven to return, and the returning can be easy.

As illustrated in FIG. 4, the second wiper arm 34 is a plate member formed in an arc shape approximately similar to the body portion 31a of the first wiper arm 31. Here, the second wiper arm 34 is formed such that the thickness becomes 1.5 mm, and the width becomes 10 mm. Further, screw holes 34a into which the fastening members 35 are screwed are formed in the second wiper arm 34 in the positions corresponding to the counterbored holes 31c of the first wiper arm 31. The second wiper arm 34 is layered on the wiper blade 33 layered on the retaining sheet 32 on the body portion 31a of the first wiper arm 31, and is then fastened to the first wiper arm 31 with the fastening members 35. Accordingly, the second wiper arm 34 sandwiches the wiper blade 33 with the first wiper arm 31.

Figure 6:
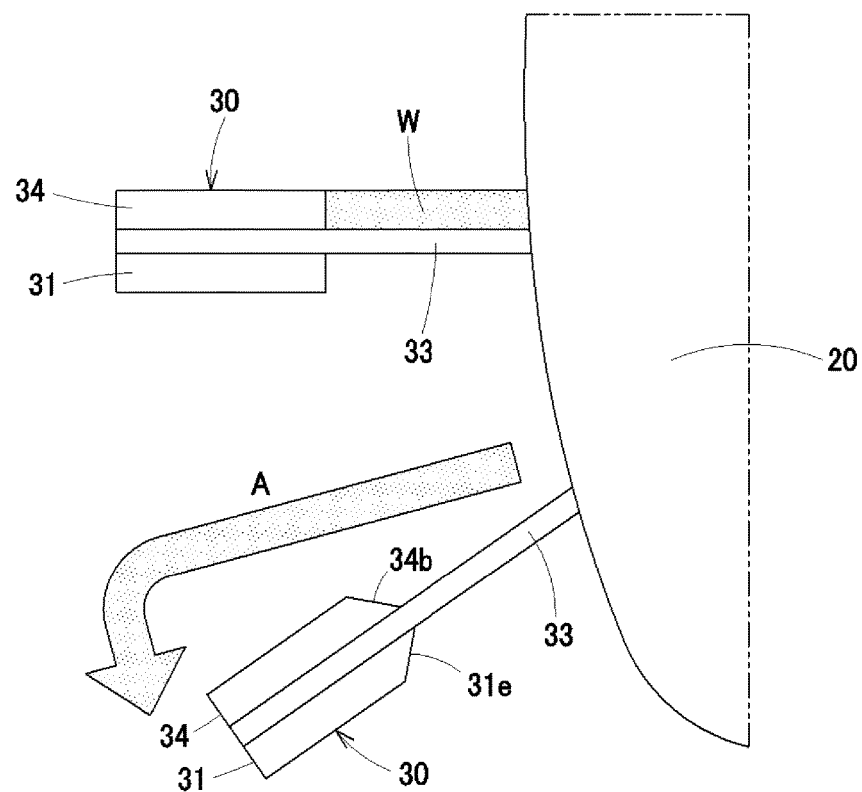
FIG. 6 is a side view illustrating a drainage slope.

Further, as illustrated in FIG. 6, a drainage slope 34b for draining a liquid W accumulated on the wiper blade 33 is formed in the inner peripheral surface of the second wiper arm 34. This drainage slope 34b is a slope formed in a corner portion of the inner peripheral surface, and is favorably formed to have an angle of 45 degrees or more with respect to the inner peripheral surface.

Therefore, the wiper mechanism 30 can allow the liquid W accumulated on the wiper blade 33 to more quickly flow down from an outer peripheral surface side through a principal surface portion, with the drainage slope 34b, as illustrated by the arrow A in FIG. 6, than a case without the drainage slope 34b, when the wiper mechanism 30 is rotated. Therefore, the wiper mechanism 30 can reliably prevent the liquid W accumulated on the wiper blade 33 from dropping to the dome-shaped cover portion 20, with the drainage slope 34b.

Note that the drainage slope 34b favorably has the angle of 45 degrees or more with respect to the inner peripheral surface. However, the angle may be 45 degrees or less. Further, the drainage slope 34b is not limited to a slope, and may be any shape as long as the shape can more quickly allow the liquid accumulated on the wiper blade 33 to flow down from the outer peripheral surface side than the case without the drainage slope 34b. For example, the shape may be a curved surface.

Further, a drainage slope 31e similar to the drainage slope 34b of the second wiper arm 34 may be provided in the inner peripheral surface of the first wiper arm 31.

As illustrated in FIG. 7, the wiper driving portion 40 is configured from the arm shafts 41a and 41a provided on the central axis of the one surface 10a of the housing body 10, the central axis passing a diameter parallel to the bottom surface (installation surface) of the dome-shaped cover portion 20, and a drive motor 43 connected to one arm shaft 41a through a transmission mechanism 42 made of a gear group including an arm gear 42a provided on the one arm shaft 41a and a motor gear 42b provided on a motor shaft 43a.

As illustrated in FIG. 2, the arm shafts 41a and 41a are provided facing each other across the dome-shaped cover portion 20, on the central axis of the one surface 10a of the housing body 10, the central axis being parallel to the bottom surface of the dome-shaped cover portion 20. Further, the arm shafts 41a are rotatably supported by a shaft support member such as bearing.

Further, as illustrated in FIG. 3, tip portions of the arm shafts 41a are notched to become semicircles in section view. Further, screw holes 41c are formed in plane portions 41b in the positions corresponding to the axis of the arm shafts 41a.

Therefore, the attaching portions 31b of the first wiper arm 31 are brought in contact with the plane portions 41b of the arm shafts 41a, and the plane portions 41b and the attaching portions 31b are fastened with the fastening members 36, so that the wiper mechanism 30 can be detachably attached. Therefore, for example, when the replacement work of the wiper blade 33 is performed, only the work to detach the wiper mechanism 30 from the arm shafts 41a is performed in a high place where the monitoring camera device 1 is typically installed, and after that, the replacement work of the wiper blade 33 can be performed in a stable place like on the ground. The replacement work of the wiper blade 33 can be safely and efficiently performed.

Figure 8:
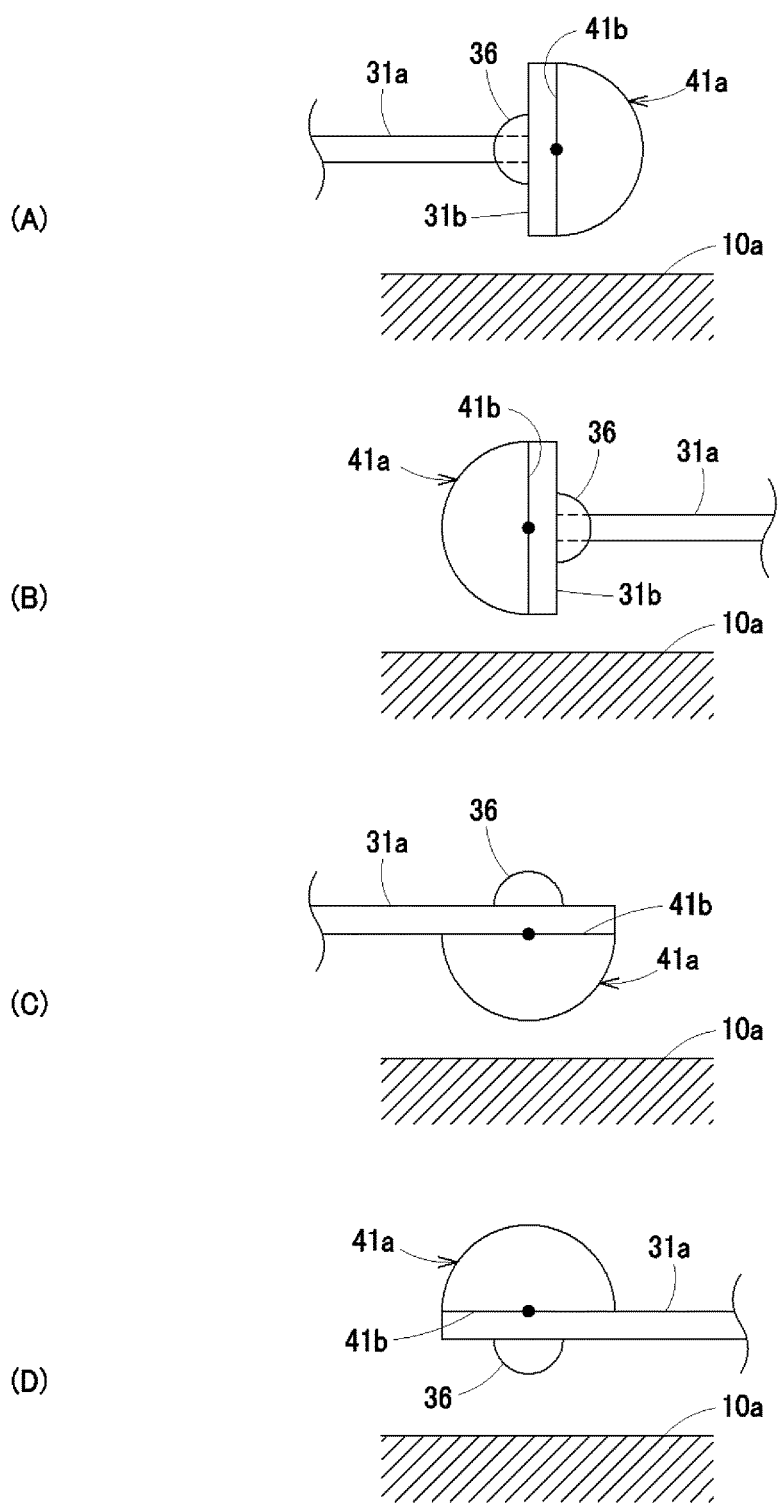
FIGS. 8(A) and 8(B) are side views illustrating arm shafts of the present invention.
FIGS. 8(C) and 8(D) are side views illustrating arm shafts of reference examples.

Further, as illustrated in FIG. 8(A), the plane portion 41b is formed or provided facing a side, that is, perpendicular to the one surface 10a of the housing body 10, at the time of non-use.

Therefore, since the attaching portions 31b of the first wiper arm 31 are provided perpendicular to the body portion 31a, in addition to the plane portions 41b being provided facing a side at the time of non-use, even if the wiper mechanism 30 is stopped at one end side of the arm shaft 41a, as illustrated in FIG. 8(A), or even if the wiper mechanism 30 is stopped at the other end side of the arm shaft 41a, as illustrated in FIG. 8(B), the head of the fastening member 36 faces a side. Therefore, a fastening tool such as a driver can be easily inserted into the head of the fastening member 36, and the fastening member 36 can be easily attached/detached.

Here, in a case where the plane portion 41b is provided parallel to the one surface 10a of the housing body 10, and the body portion 31a is attached to the plane portion 41b and is fastened with the fastening member 36, without providing the attaching portion 31b of the first wiper arm 31, as illustrated in FIG. 8(C), the head of the fastening member 36 is arranged to the housing body 10 side when the wiper mechanism 30 is stopped at the other end side of the arm shaft 41a, as illustrated in FIG. 8(D), and the fastening tool such as a driver cannot be inserted into the head of the fastening member 36. Therefore, in such a case, the wiper mechanism 30 needs to be driven only for the work to detach the wiper mechanism 30.

Note that the plane portions 41b may be provided parallel to the one surface 10a of the housing body 10, and the body portions 31a may be attached to the plane portions 41b without providing the attaching portions 31b of the first wiper arm 31.

As illustrated in FIG. 7, the transmission mechanism 42 is configured from the arm gear 42a provided in the arm shaft 41a on the one end side, the motor gear 42b provided in the motor shaft 43a and meshed with the arm gear 42a, and the like. Such a transmission member 42 transmits drive force from the drive motor 43 to the arm shaft 41a. Further, as illustrated in FIGS. 1 and 2, the transmission mechanism 42 is protected by being built in the housing body 10, or by being covered with a transmission mechanism cover member 44 provided on the housing body 10.

The drive motor 43 may be any known drive motor as long as the drive motor can rotate the wiper mechanism 30 through the transmission mechanism 42 and the arm shaft 41a, and is built in the housing body 10, for example.

The wiper driving portion 40 having the above configuration is controlled by a control unit 54 made of a control circuit 54 and the like built in the housing body 10, thereby to drive the wiper mechanism 30 odd number of times. In other words, the control unit 54 controls the wiper driving portion 40 to drive the wiper mechanism 30 odd number of times.

To be specific, when having received a drive signal from an external monitoring control room, the control unit 54 drives the drive motor 43 of the wiper driving portion 40 in a normal direction and/or a reverse direction, to rotate the wiper mechanism 30 to be stopped at a reverse activation start side at an opposite side to an activation start side by driving the drive motor 43 odd number of times, such as once, three times, or five times, when rotating of the wiper mechanism 30 by +180 degrees from the one end side to the other end side of the arm shafts 41a, or by −180 degrees from the other end side to the one end side of the arm shafts 41a is counted as once.

For example, in a case of driving the drive motor 43 even number of times, such as twice, four times, or six times, to stop the wiper mechanism 30 at the activation start side, the water drops wiped by the wiper mechanism 30 when the wiper mechanism 30 is rotated from the activation start side to the reverse activation start side flows down on the surface of the dome-shaped cover portion 20 at the reverse activation start side when the wiper mechanism 30 is rotated from the reverse activation start side to the activation start side, and a view of the dome-shaped cover portion 20 at the reverse activation start side becomes worse. In contrast, in a case of driving the drive motor 43 odd number of times to stop the wiper mechanism 30 at the reverse activation start side, the water drops can be prevented from falling down.

Note that the monitoring camera device 1 favorably drives the wiper mechanism 30 odd number of times, and stops the wiper mechanism 30 at the reverse activation start side. However, the monitoring camera device 1 may drive the wiper mechanism 30 even number of times and stops the wiper mechanism 30 at the activation start side. Further, the monitoring camera device 1 may appropriately select either to drive the wiper mechanism 30 odd number of times and stop the wiper mechanism 30 at the reverse activation start side, or to drive the wiper mechanism 30 even number of times and stop the wiper mechanism 30 at the activation start side. Further, the monitoring camera device 1 may automatically rotate the wiper mechanism 30 at a predetermined time or at predetermined intervals with a built-in timer, in addition to/in place of detecting the drive signal from the monitoring control room to rotate the wiper mechanism 30.

Next, a method of cleaning the dome-shaped cover portion 20 of the monitoring camera device 1 will be described.

First, when having detected the drive signal from the external monitoring control room, for example, the control unit 54 of the monitoring camera device 1 drives the drive motor 43 in the normal direction to rotate the wiper mechanism 30 arranged on the one end side of the arm shafts 41a from the one end side toward the other end side of the arm shafts 41a by +180 degrees.

Next, the control unit 54 drives the drive motor 43 in the reverse direction to rotate the wiper mechanism 30 arranged on the other end side of the arm shafts 41a from the other end side to the one end side of the arm shafts 41a by −180 degrees.

Next, the control unit 54 drives the drive motor 43 in the normal direction again to rotate the wiper mechanism 30 arranged on the one end side of the arm shafts 41a from the one end side to the other end side of the arm shafts 41a by +180 degrees.

As described above, the monitoring camera device 1 drives the wiper mechanism 30 odd number of times, and removes the dust or the water drops at the time of raining attached to the surface of the dome-shaped cover portion 20 to clean the dome-shaped cover portion 20, without damaging the dome-shaped cover portion 20.

Then, the applicant of the present application has found out that, in the monitoring camera device 1, the wiper blade 33 is formed of silicon rubber and provided such that the thickness becomes 0.5 mm and the width becomes 18 mm, the wiper blade 33 is sandwiched by the first and second wiper arms 31 and 34 formed such that the width becomes 10 mm and the inner peripheral surfaces are separated from the surface of the dome-shaped cover portion 20 by 5 mm, and the wiper mechanism 30 is provided protruding from the inner peripheral surfaces of the first and second wiper arms 31 and 34 by 8 mm, and overlapping with the surface of the dome-shaped cover portion 20 by 3 mm, thereby to remove the dust or the water drops attached to the surface of the dome-shaped cover portion 20 without damaging the surface of the dome-shaped cover portion 20 made of plastic such as polycarbonate. Further, with the configuration, the applicant of the present application has found that resistance can be reduced than conventional ones, in a turn such as rotating the wiper mechanism 30 by +180 degrees and then rotating the wiper mechanism 30 by −180 degrees.

As described above, in the monitoring camera device 1, the wiper blade 33 is formed of silicon rubber, and is provided such that a part of the wiper blade 33 overlaps with the surface of the dome-shaped cover portion 20. Therefore, the dust or water drops attached to the surface of the dome-shaped cover portion 20 can be removed without damaging the surface of the dome-shaped cover portion 20 made of plastic such as polycarbonate.

Further, the monitoring camera device 1 is provided such that the wiper blade 33 is provided such that the thickness becomes 0.5 mm and the width becomes 18 mm, the wiper blade 33 is sandwiched by the first and second wiper arms 31 and 34 formed such that the width becomes 10 mm and the inner peripheral surfaces are separated from the surface of the dome-shaped cover portion 20 by 5 mm, and the wiper blade 33 is provided protruding from the inner peripheral surfaces of the first and second wiper arms 31 and 34 by 8 mm, and overlapping with the surface of the dome-shaped cover portion 20 by 3 mm. Therefore, the monitoring camera device 1 can reduce the resistance than conventional ones in a turn such as rotating the wiper mechanism 30 by +180 degrees and then rotating the wiper mechanism 30 by −180 degrees.

Further, the monitoring camera device 1 is provided such that the body portion 31a of the first wiper arm 31 is provided offset from the axis of the through holes 31d of the attaching portions 31b of the first wiper arm 31, and the thickness center of the wiper blade 33 accords with the axis of the through holes 31d. Further, the monitoring camera device 1 has the screw holes 41c formed in the positions corresponding to the axis of the arm shafts 41a of the plane portions 41b of the arm shafts 41a. Therefore, the monitoring camera device 1 can easily cause the thickness center of the wiper blade 33 to accord with the axis of the arm shafts 41a by attaching the attaching portions 31b to the plane portions 41b to attach the wiper mechanism 30 to the arm shafts 41a. Further, the monitoring camera device 1 is provided such that the thickness center of the wiper blade 33 accords with the axis of the through holes 31d. Therefore, the wiper mechanism 30 can be attached without caring about the direction in the work to attach the wiper mechanism 30 to the arm shafts 41a, and the workability is good.

Note that the monitoring camera device 1 may be provided with a washer liquid discharge mechanism that discharges a washer liquid to the surface of the dome-shaped cover portion 20 in anywhere in the one surface 10a of the housing body 10, and more reliably prevent the wiper mechanism 30 from damaging the surface of the dome-shaped cover portion 20 when the wiper mechanism 30 is rotated.

GLOSSARY OF DRAWING REFERENCES

1 . . . monitoring camera device, 10 . . . housing body, 10a . . . one surface, 20 . . . dome-shaped cover portion, 30 . . . wiper mechanism, 31 . . . first wiper arm, 31a . . . body portion, 31b . . . attaching portion, 31c . . . counterbored hole, 31d . . . through hole, 31e . . . drainage slope, 32 . . . retaining sheet, 32a . . . fitting hole, 33 . . . wiper blade, 33a . . . inserting hole, 33b . . . inner peripheral surface, 34 . . . second wiper arm, 34a . . . screw hole, 34b . . . drainage slope, 35 . . . fastening member, 36 . . . fastening member, 40 . . . wiper driving portion, 41a . . . arm shaft, 41b . . . plane portion, 41c . . . screw hole, 42 . . . transmission mechanism, 42a . . . arm gear, 42b . . . motor gear, 43 . . . drive motor, 43a . . . motor shaft, 44 . . . transmission mechanism cover member, 50 . . . monitoring camera, 51 . . . motor drive circuit, 52 . . . timer, 53 . . . memory, 54 . . . control unit (control circuit)

The invention claimed is:

1. A monitoring camera device comprising:
 a housing body in which at least a monitoring camera is disposed;
 a transparent plastic-made semispherical dome-shaped cover provided on one surface of the housing body;
 a wiper mechanism rotatably provided on the housing body, the wiper mechanism being configured to clean the dome-shaped cover, the wiper mechanism including: (i) a silicon rubber-made wiper blade having an arc surface with a corresponding shape as a curved surface of the dome-shaped cover, and (ii) a first wiper arm having both ends rotatably provided around a central axis of the housing body, the central axis being parallel to a bottom surface of the dome-shaped cover, the wiper blade being attached to the first wiper arm and protruding from the first wiper arm to a side of the dome-shaped cover by a predetermined length, the wiper blade being configured to contact the side of the dome-shaped cover; and
 a wiper driving mechanism configured to reciprocatively rotate and drive the wiper mechanism to cause the arc surface of the wiper blade to contact and move along the curved surface of the dome-shaped cover.

2. The monitoring camera device according to claim 1, further comprising:
 a control unit configured to control the wiper driving mechanism, the control unit driving the wiper driving mechanism to drive the wiper mechanism an odd number of times.

3. The monitoring camera device according to claim 1, wherein an inner peripheral surface of the first wiper arm includes a drainage slope that drains a liquid accumulated on the first wiper blade from an outer peripheral surface side through a principal surface.

4. The monitoring camera device according to claim 1, wherein:
 the wiper blade is attached by being sandwiched between the first wiper arm and a second wiper arm; and
 a thickness center of the first wiper blade corresponds with an axis of a rotating axis of the wiper driving mechanism.

5. The monitoring camera device according to claim 4, wherein the wiper mechanism further includes a retaining sheet between the first wiper arm and the second wiper arm, a fastening member configured to fasten the first wiper arm and the second wiper arm is fit through the retaining sheet.

* * * * *